United States Patent

Elbers et al.

[11] Patent Number: 5,950,005
[45] Date of Patent: Sep. 7, 1999

[54] METHOD FOR STORING A MULTIMEDIA TITLE INCLUDING AN OCCURRENCE TABLE AND AN EXECUTION PROFILE TABLE THEREFOR UNITARY STORAGE MEDIUM PROVIDED WITH SUCH TITLE AND A PLATFORM SUBSYSTEM FOR EVALUATING MEMORY AND PROCESSING REQUIREMENTS FOR SUCH APPLICATION

[75] Inventors: Gerard J. Elbers; Cornelis M. Huizer, both of Eindhoven, Netherlands

[73] Assignee: U.S. Philips Corporation, New York, N.Y.

[21] Appl. No.: 08/800,448

[22] Filed: Feb. 18, 1997

[30] Foreign Application Priority Data

Feb. 16, 1996 [EP] European Pat. Off. .............. 96200398

[51] Int. Cl.[6] ..................................... G06F 9/455
[52] U.S. Cl. ............................. 395/705; 395/674
[58] Field of Search .................................. 395/704, 705, 395/674

[56] References Cited

U.S. PATENT DOCUMENTS

| 5,317,732 | 5/1994 | Gerlach et al. .......................... 707/104 |
| 5,355,484 | 10/1994 | Record et al. ............................ 395/704 |
| 5,359,725 | 10/1994 | Garcia et al. ............................. 711/111 |
| 5,423,043 | 6/1995 | Fitzpatrick et al. ...................... 395/683 |
| 5,625,821 | 4/1997 | Record et al. ............................ 395/670 |
| 5,768,500 | 6/1998 | Agrawal et al. ......................... 395/704 |

*Primary Examiner*—Tariq R. Hafiz
*Assistant Examiner*—John Q. Chavis
*Attorney, Agent, or Firm*—Gregory L. Thorne

[57] ABSTRACT

A multimedia application title is stored for execution on different platforms. Associated to the title is an occurrence table that lists the number of occurrences of each of at least a substantial fraction of all operations in the application, and also an execution profile table that lists the relative execution occurrence frequencies of each of at least a substantial fraction of all operations in the application. When loading the application title, its occurrence and execution profile tables are accessed. Through OP2INS and MOPS2MIPS conversion data for each operation, memory and processing requirements for executing the title are evaluated and an evaluation result signalled to a user.

6 Claims, 3 Drawing Sheets

METHOD FOR STORING A MULTIMEDIA TITLE INCLUDING AN OCCURRENCE TABLE AND AN EXECUTION PROFILE TABLE THEREFOR UNITARY STORAGE MEDIUM PROVIDED WITH SUCH TITLE AND A PLATFORM SUBSYSTEM FOR EVALUATING MEMORY AND PROCESSING REQUIREMENTS FOR SUCH APPLICATION

This application claims priority of EPO Application 96200398.4 filed on Feb. 16, 1996.

BACKGROUND OF THE INVENTION

The invention relates to a method for storing multimedia application information that allows for subsequent execution on different platforms and presentation to a user. Multimedia application programs or applications should be executable on different platforms. Such platform must satisfy minimum resource requirements for being able to guarantee that the application in question will run thereon correctly. A method according to the preamble has been disclosed in EP Application 95202811.6, corresponding U.S. application Ser. No. 08/735,275 (PHN 15497) by Elbers, assigned to the present assignee and herein being incorporated by reference. A general approach for designing or writing an application in such a way that it is enabled to run on one of many possible target platforms is by scripting: therein the program is written for a virtual platform, whereas it will later on be run on any of a set of real target platforms. Scripting in particular has been considered in EP Application 731,971 corresponding U.S. application Ser. No. 08/533,030 (PHN 15058) by Gelissen, assigned to the present assignee and herein being incorporated by reference. More in detail, an appropriate language therefor has been described in the OSMOSE project, ESPRIT project 6788, public version 1.0, Copyright Philips Electronics, Eindhoven, The Netherlands, and presented to the US PTO in the latter application's docket.

It is a problem that the platform should have enough facilities such as in terms of processing speed and memory storage, or rather, the application should not require more than a certain amount of facilities for allowing the application to run in real-time. Correct operation in a multi-tasking environment is even more difficult to predict; in particular so, because also other unpredictable tasks could be running simultaneously. Therefore, verifying the correct operation, and in certain cases, the balancing between quality of execution and speed of execution is required for various platforms.

SUMMARY TO THE INVENTION

In consequence, amongst other things, it is an object of the present invention to design an application in such a way that it can be run on various different platforms, each time with verified performance and memory requirements, while it should not be necessary to verify each application for every platform beforehand. Now, according to one of its aspects, the invention is characterized by associating to the application an occurrence table that contains the number of occurrences of each of at least a substantial fraction of all operations in the application, and furthermore an execution profile table, that contains the relative frequencies of execution occurrence of each of at least a substantial fraction of all operations in the application. The extra information to be associated to the title can be generated in an automatical manner and has a relatively small size.

The invention also relates to a unitary storage medium having at least one multimedia application title intended for execution on different platforms and presentation to a user, characterized by having associated to the application title an occurrence table that contains the number of occurrences of each of at least a substantial fraction of all operations in the title, and furthermore an execution profile table, that contains the relative execution occurrence frequencies of each of at least a substantial fraction of all operations in the title. The amount of necessary extra storage for the invention is generally negligible, but the usefulness of the storage organization is much enhanced.

The invention also relates to a platform subsystem for executing a multimedia application title for subsequent execution on different platforms and presentation to a user, characterized by having evaluation means for at initially loading the application title in question, accessing an occurrence table associated with the application and which contains the numbers of occurrences of each of at least a substantial fraction of all operations in the application, and furthermore accessing an execution profile table, which contains the relative execution occurrence frequencies of each of at least a substantial fraction of all operations in the application, said evaluation means for each such operation having OP2INS and MOPS2MIPS conversion informations, and said evaluation means being arranged for on the basis of these informations, evaluating memory requirements and processing power requirements for executing the application title in question, and having signalling means fed by said evaluation means for signalling an evaluation result to a user. The evaluation result may be "good" or "bad", and in the latter case, the execution cannot be started. Various further aspects of the invention are recited in dependent claims.

BRIEF DESCRIPTION OF THE DRAWING

These and other aspects and advantages of the invention will be discussed more in detail hereinafter with reference to the disclosure of preferred embodiments, and in particular with reference to the appended Figures that show.

PRINCIPLE OF THE INVENTION

Figure 1:
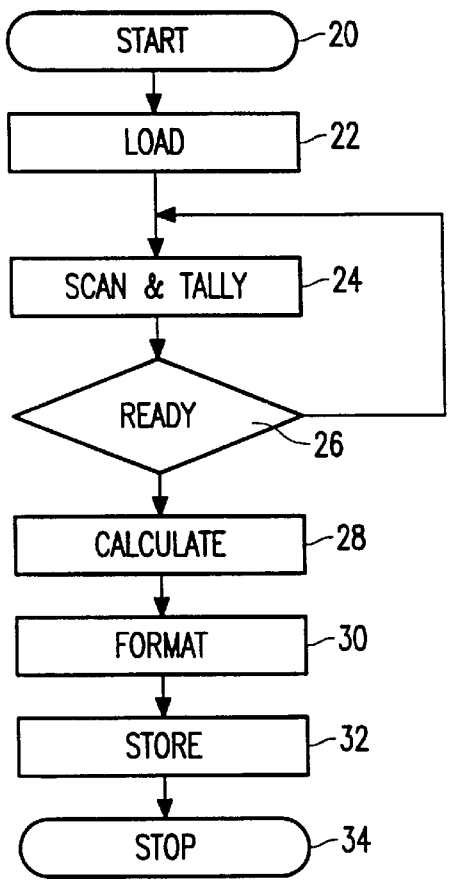
FIG. 1, a flow chart for storing an application according to the invention.

For better grasping the methodology of the invention, the following conceptual framework is presented with reference to the memory requirements:

a. The basic executive unit of a virtual platform is the operation, that describes the ultimate result. The basic executive unit of a real target platform is the instruction, that describes what the platform must do.

2. Within each target platform, and for each different operation the required number of instructions is defined in an associated OP2INS (pronounce: op-to-ins) quantity. If the script of the application has been written in assembler or native code for the platform in question, the value of OP2INS is effectively equal to one. For other situations, the value is generally greater than one. For example, the script may contain the following instruction:

repeat 100
    add R1, R2, R3

Now, if the platform has a three-input ALU, this instruction needs three registers, one for each of the operands to be added. In case of a two-input ALU, an additional register may be required for the intermediate result of adding two of the three operands. From practical experience it was found, that the OP2INS may have values in the range of 2 to 3, if specialized instructions must be executed by non-specialized hardware. The advantage of the present organization is that this information need not be known in some central authority, that should know all applicable platforms, whether present or future ones.

3. An application title contains an occurrence table, listing for each of at least a substantial fraction of the respective operations the number of occurrences therein. Those are at least the operations that occur most frequently in the application, but in an optimum situation, it should be listed for all respective operations.

4. At load time, the application must be translated to native code. Then or just before, the loader/platform combines the accessed occurrence table with the OP2INS data of the targeted platform, to determine memory requirements. Subsequently, it determines the optimum execution parameters such as the level of detail of a visual display, such as expressed in the number of pixels per area, to store the specific program in the memory area available at the platform in question. Thus, before effectively executing the application, the amount of necessary storage is known.

Moreover, the following conceptual framework is presented with reference to the processor performance requirements:

a. The basic performance unit of a virtual platform is the (million) operations per second (OPS or MOPS). The basic performance unit of a real target platform is the (million) instructions per second (IPS or MIPS).

2. Within each target platform and for each different operation the required number of machine cycles is defined in an associated MOPS2MIPS (pronounce: mops-to-mips) quantity. If the script of the application in question had been written in assembler or native code for the platform in question, the value of MOPS2MIPS is effectively equal to one. For other situations, the value is generally greater than one. The value of MOPS2MIPS for a certain operation may differ from its OP2INS value; in particular, the former may be larger. For example, to execute a multiplication in a processor that does not have specialized hardware therefor, the MOPS2MIPS value may be in the range of 100.

3. To an application title is associated an execution profile table, listing the relative execution frequencies of at least the most important operations therein. The most important instructions are those requiring many machine cycles for execution, such as, for example multiplication operations. For example, the script may contain the following instruction:

repeat 100
  add R1, R2

In the occurrence table, this instruction will occur only once, and the amount of memory needs to be present only once. On the other hand, in the relative execution frequency table, this instruction will occur 100 times, because the addition must be executed 100 times. The instruction repeat 100
  mult R1, R2 would then have both a MOPS2MIPS quantity, and an execution frequency of 100. The equality of these two quantities is of course a matter of coincidence.

If necessary, multiple execution profiles can be given to accurately model the application relative to certain execution situations. For example, the profile may depend on aspects of a particular user, such as a level of skill, in that an expert game player would need a faster reaction from the game than a novice. Another divergence may depend on a particular choice made during the execution of the application.

4. At load time, the application must be translated into native code. Then or just before, the loader/platform combines the accessed execution profile table with the MOPS2MIPS data of the targeted platform, to determine requirements for processor performance. Subsequently, it determines the optimum execution parameters such as the level of detail to complete the specific tasks for the specific program within the time available for executing the application in question. Thus, before effectively executing the application, or even before loading it, the processor load can be determined. In a particular set-up, the evaluation which is actuated before actual loading will produce a multivalued signal. One value would be "no", which either blocks the apparatus from loading the application, or is signalled to a user for dissuading that person from actually loading. This is done if the facilities in the platform are insufficient. Another signal value would be "yes", indicating that loading is allowed. Still another could be: loading O.K., provided that all or certain other applications be terminated. Still another one could be: loading OK, but for optimum performance all or certain other applications should be terminated, or rather, run at a lower performance mode that would necessitate fewer facilities.

DETAILED DESCRIPTION OF PREFERRED EMBODIMENTS

FIG. 1 is a flow chart for storing an application title according to the invention. Block 20 initializes the system. In block 22, the application is loaded in whole or in part, starting from the beginning and proceeding at sequential addresses, as far as the front end storage of the available data processing facility allows. In block 24, the information so loaded is scanned, all data is ignored, and each type of operation is counted to form a respectively associated tally. In block 26, the system detects whether the title, or if applicable, a particular module thereof, has been fully processed. If no, the system reverts to block 22. If yes, in block 28, the relative occurrence frequencies of all, or of the most important operations are calculated, and also the execution frequencies. In block 30 the information so acquired is formatted for subsequently forming an occurrence table and an execution profile table. In block 32, these two tables are stored, such as on tape, or are stored together with the title on a master optical disc. In block 34, the processing terminates, or allows to revert to block 22 for processing a further title.

Figure 2:
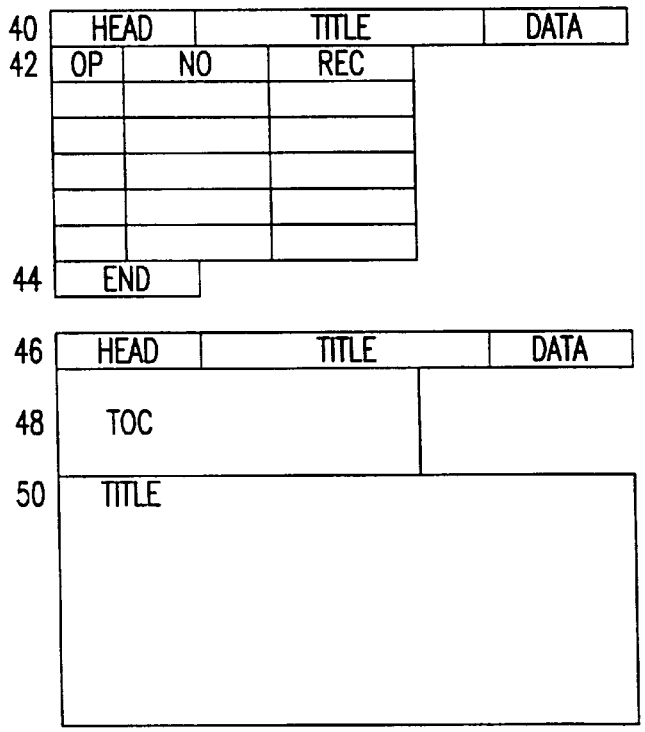
FIG. 2, a unitary storage medium so formed.

FIG. 2 shows a unitary storage medium formed according to the method described with reference to FIG. 1. The physical configuration may be that of a conventional optical or magnetic disc, tape, etcetera. The format on a relatively high level contains the various elements shown in the Figure. The upper part of the Figure represents the occurrence table and the execution profile table, fused herein to a single data base. Therein, line 40 contains in succession a header that identifies the data base in question, an identifier of the associated application title, and data on the size and/or structure of the data base. Lines 42 and following each identify a respective operation, and furthermore state the number of the operations in question appearing in the title, and the relative frequency of occurrence of that operation. Line 44 indicates the end of the data base in question. It may point to the associated title.

The lower part of the Figure represents the title proper, that may or may not be stored contiguously to the data base discussed supra. Line 46 again contains a header, a descriptor of the title, and data indicating size and/or structure of the title. Block 48 contains a table of contents. Block 50 contains the information proper of the application title, including program, data, comments, etcetera.

Figure 3:
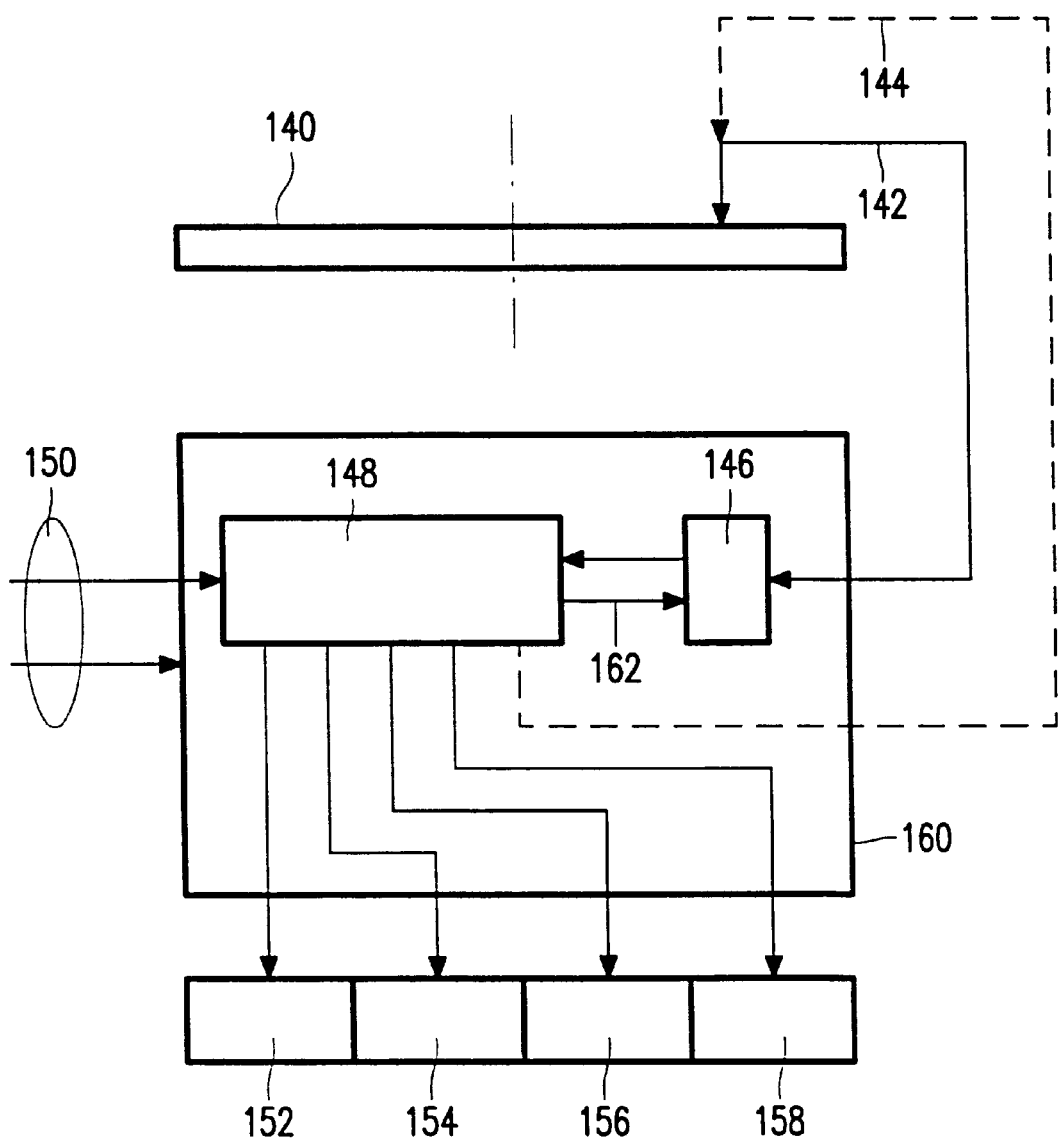
FIG. 3, a platform system for playing the above medium.

FIG. 3 shows a platform system for playing the medium schematized in FIG. 2. The disc-shaped record medium 140 is accessed by read arrangement 142 under control of positioning signals on line 144. The platform proper 160 has user interface 150 for inputting user commands and evaluation block 146 that upon loading the application accesses the data base discussed supra. The evaluation block moreover, for each operation knows the OP2INS and MOPS2MIPS quantities associated with the platform in question. Therefore, from combining the data base information with the two latter quantities, the evaluation block can calculate memory requirement and processing power requirement for executing the application. If applicable, the evaluation block may take into account that the title can be executed at various levels of quality, such as pertaining to the number of pixels and/or colours, and various others. The evaluation block will then be able to give a yes/no decision output signal for each of such various possibilities, whilst indicating to the user the impact of a possibly reduced quality.

If the user or the system react positively to the outcome provided by the evaluation block, the executing of the title may be undertaken in central processing device 148. This may convert the title in part as discussed in the cited Gelissen reference and may subsequently process the various information streams of the title, if applicable under selective assigning of processing power and further facilities according to the above Elbers reference. Device 148 may output various user information signals to user output facilities 152–158, that may contain audio, video, and/or data channels.

Figure 4:
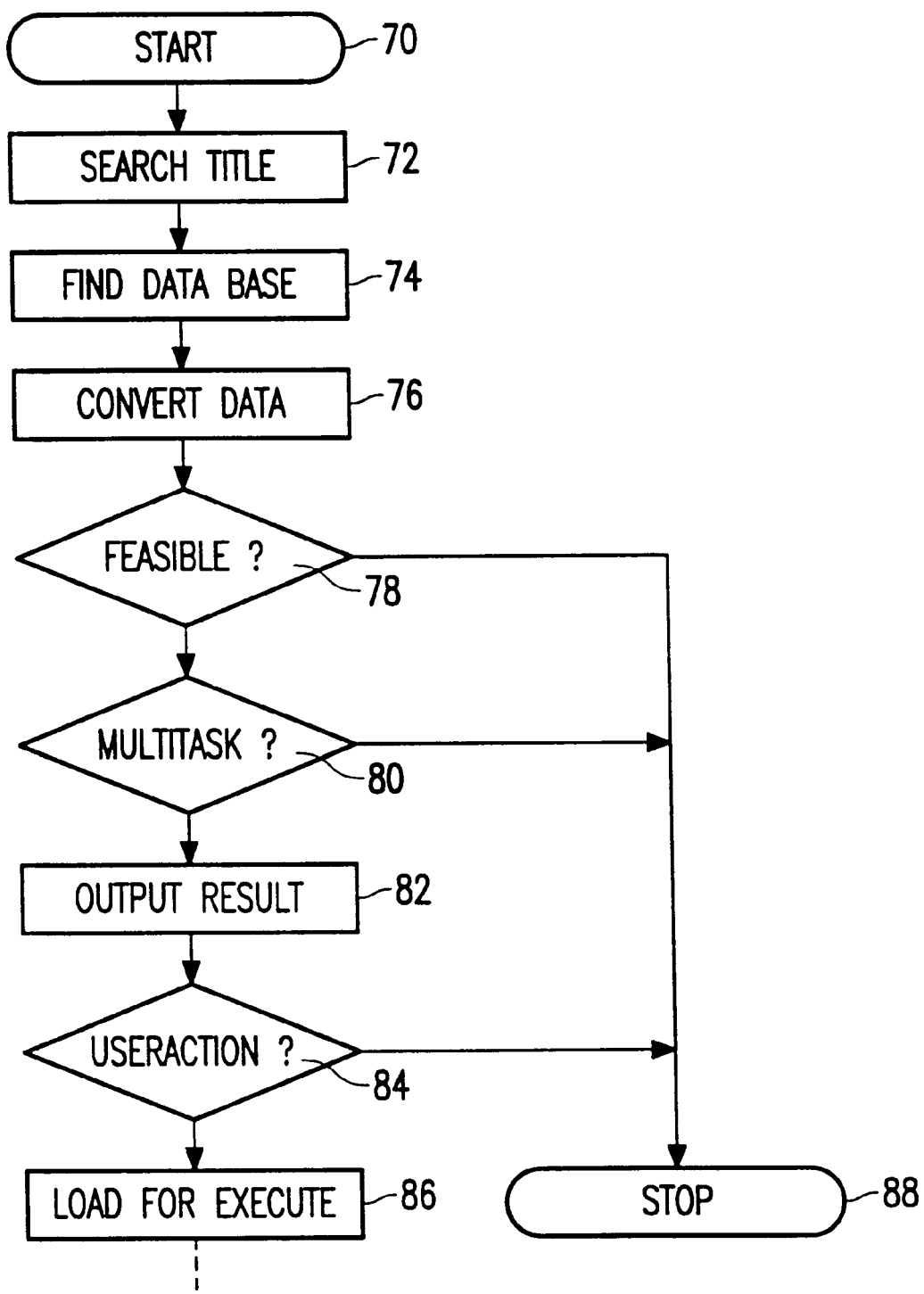
FIG. 4, a flow chart for loading and accessing the application according to the invention.

FIG. 4 is a flow chart regarding the loading and accessing of the application according to the invention. In block 70, the platform subsystem initializes. In block 72 the user requests the platform to search for a particular title on the storage medium that has been placed into an appropriate berth. Alternatively, the medium is remote, such as in a video-on-demand service or the like. Upon finding the title, the platform automatically searches for the associated data base described with reference to FIG. 2. The data base may be pointed at by the title, it may have a predetermined offset with respect to the title, or it may even be part of the title itself. Then in block 76, the evaluation device of the platform converts the data of the data base and accumulates them into INS and MIPS quantities as applicable to the instant platform, and therefrom evaluates memory and processing requirements necessary for the title versus those facilities actually available in the platform. If the executing of the title is feasible, this is signalled to the user (block 82) in an appropriate manner, such as by a 'go' indication. In certain situations, the feasibility may depend on certain circumstances, such as the coexistent running of other tasks (block 80), or on the required performance level of the title. This means that block 78 as well as block 80 have an 'unfeasible' output leading to stop block 88, wherein the title is discarded. In block 86, the platform waits for a user action that may select the title for execution, or select to terminate other tasks that would still block the feasible execution (and are so signalled by the platform), or select one of various performance levels of the execution. Here, the user takes into account the overall facilities of the platform, or rather only those that are free or can be freed. Upon reception of a positive user response, the platform goes on to load and execute the title. If the user rejects the proposal, the system exits to block 88.

We claim:

1. A method for storing multimedia application information that allows for subsequent execution on different platforms and presentation to a user, said method comprising the steps of:

associating to the application an occurrence table that contains the number of occurrences of each of at least a substantial fraction of all operations in the application; and developing an execution profile table, that contains the relative frequencies of execution occurrence of each of at least a substantial fraction of all operations in the application.

2. A unitary storage medium having at least one multimedia application title intended for execution on different platforms and presentation to a user, said medium comprising:

an application title configured to associate an occurrence table that contains the number of occurrences of each of at least a substantial fraction of all operations in the title; and an execution profile table configured to contain the relative execution occurrence frequencies of each of at least a substantial fraction of all operations in the title.

3. A platform subsystem for executing a multimedia application title for subsequent execution on different platforms and presentation to a user, said system comprising an evaluation means configured to execute the application title in question, configured to access an occurrence table associated with the application and which contains the numbers of occurrences of a portion of all operations in the application, and configured to access an execution profile table, which contains the relative execution occurrence frequencies of said portion of all operations in the application, said evaluation means for each such operation having OP2INS and MOPS2MIPS conversion informations, and said evaluation means being arranged for on the basis of these informations, evaluating memory requirements and processing power requirements for executing the application title in question, and having signalling means fed by said evaluation means, said signalling means being configured to signal an evaluation result to a user.

4. A platform subsystem as claimed in claim 3, wherein said evaluation means is configured to be actuated before loading the application title, and in response to being actuated, configured to generate an at least yes/no signalization for through the latter either blocking the apparatus or dissuading a user person from loading the application title in question.

5. A platform subsystem as claimed in claims 3 or 4, wherein said evaluation result is configured to contain a quality-of-execution information.

6. A platform subsystem as claimed in claim 3, wherein said evaluation means are arranged for evaluating corresponding such requirements by other tasks presently running in a multi-tasking environment for determining such evaluation result.

* * * * *